(12) United States Patent
Duren et al.

(10) Patent No.: US 7,621,883 B2
(45) Date of Patent: Nov. 24, 2009

(54) SLIDE LOCK

(75) Inventors: John J. Duren, Kewaskum, WI (US); Darren Hamm, Grafton, WI (US)

(73) Assignee: Patterson Medical Products, Inc., Bolingbrook, IL (US)

( * ) Notice: Subject to any disclaimer, the term of this patent is extended or adjusted under 35 U.S.C. 154(b) by 0 days.

(21) Appl. No.: 10/964,938

(22) Filed: Oct. 14, 2004

(65) Prior Publication Data

US 2006/0084897 A1 Apr. 20, 2006

(51) Int. Cl.
*A61F 5/00* (2006.01)
*A61F 5/01* (2006.01)
*A61F 5/04* (2006.01)
*A61F 5/05* (2006.01)
*A61F 5/10* (2006.01)

(52) U.S. Cl. .................. 602/21; 602/5; 602/6; 602/12; 602/22; 128/878; 128/879; 128/880

(58) Field of Classification Search .................. 602/21, 602/20, 22, 64, 5, 6, 12; 128/878, 877, 879, 128/880; 251/4, 6, 2, 8, 9; 292/70, 73–75, 292/77, 150, 193, 292, 301; 24/136 R, 115 M, 24/136 L
See application file for complete search history.

(56) References Cited

U.S. PATENT DOCUMENTS

| 2,595,511 | A | * | 5/1952 | Butler | 251/6 |
|---|---|---|---|---|---|
| 3,099,429 | A | * | 7/1963 | Broman | 251/6 |
| 3,189,038 | A | * | 6/1965 | Von Pechmann | 137/315.07 |
| 3,297,558 | A | * | 1/1967 | Hillquist | 204/409 |
| 3,497,175 | A | * | 2/1970 | Koland | 251/9 |
| 3,533,439 | A | * | 10/1970 | Hall | 137/595 |
| 3,625,472 | A | * | 12/1971 | Rychlik | 251/6 |
| 3,685,787 | A | * | 8/1972 | Adelberg | 251/6 |
| 3,802,463 | A | * | 4/1974 | Dabney | 137/625.3 |
| 3,900,184 | A | * | 8/1975 | Burke et al. | 251/6 |
| 3,915,167 | A | * | 10/1975 | Waterman | 604/250 |
| 3,960,149 | A | * | 6/1976 | Bujan | 604/250 |
| 3,984,081 | A | * | 10/1976 | Hoganson | 251/6 |
| 4,013,263 | A | * | 3/1977 | Adelberg | 251/6 |
| 4,047,694 | A | * | 9/1977 | Adelberg | 251/6 |
| D250,085 | S | * | 10/1978 | Tuttle | D24/129 |
| 4,195,526 | A | * | 4/1980 | Amos et al. | 73/864.11 |
| 4,238,108 | A | * | 12/1980 | Muetterties | 251/6 |
| 4,265,425 | A | * | 5/1981 | Morin | 251/9 |
| 4,320,889 | A | * | 3/1982 | Genese | 251/6 |
| 4,399,103 | A | * | 8/1983 | Ferrara | 422/100 |
| 4,406,440 | A | * | 9/1983 | Kulle et al. | 251/6 |
| 4,475,709 | A | * | 10/1984 | Becker, Jr. | 251/6 |
| 4,559,045 | A | * | 12/1985 | Danby et al. | 604/250 |
| 4,602,620 | A | * | 7/1986 | Marx | 602/21 |
| 4,620,690 | A | * | 11/1986 | Kamen | 251/8 |
| 4,644,938 | A | * | 2/1987 | Yates et al. | 601/40 |
| 4,725,037 | A | * | 2/1988 | Adelberg | 251/6 |
| 4,765,320 | A | * | 8/1988 | Lindemann et al. | 602/22 |

(Continued)

*Primary Examiner*—Justine R Yu
*Assistant Examiner*—Clinton Ostrup
(74) *Attorney, Agent, or Firm*—McDonnell Boehnen Hulbert & Berghoff LLP

(57) ABSTRACT

The invention is a slide lock for adjusting static progressive splints having a housing, a glide member, and a wheel whereby a monofilament can pass through the housing and be securely held in place by using the glide to force the wheel toward the floor of the housing.

2 Claims, 2 Drawing Sheets

U.S. PATENT DOCUMENTS

| | | | |
|---|---|---|---|
| 4,772,012 A * | 9/1988 | Chesher | 482/47 |
| 4,790,300 A * | 12/1988 | Marx | 602/21 |
| 4,790,301 A * | 12/1988 | Silfverskiold | 602/22 |
| D299,272 S * | 1/1989 | Marx | D24/190 |
| 4,862,877 A * | 9/1989 | Barber | 602/22 |
| 4,895,340 A * | 1/1990 | Forberg | 251/6 |
| 4,919,389 A * | 4/1990 | Hoekwater et al. | 251/6 |
| 4,974,811 A * | 12/1990 | Ishida | 251/6 |
| 5,014,962 A * | 5/1991 | Adelberg | 251/6 |
| 5,190,079 A * | 3/1993 | Nakada | 138/45 |
| 5,257,770 A * | 11/1993 | Grove | 251/4 |
| 5,413,554 A * | 5/1995 | Trueman | 602/21 |
| 5,477,593 A | 12/1995 | Leick | |
| 5,718,409 A * | 2/1998 | Starchevich | 251/6 |
| 5,865,714 A * | 2/1999 | Marlowe | 482/112 |
| 5,876,363 A * | 3/1999 | Marx | 602/21 |
| 6,129,330 A * | 10/2000 | Guala | 251/6 |
| 6,341,757 B1 * | 1/2002 | Starchevich | 251/6 |
| 6,371,932 B1 * | 4/2002 | Foote | 602/22 |
| 6,536,739 B1 * | 3/2003 | Jensen | 251/6 |
| 6,770,055 B2 * | 8/2004 | Bierman et al. | 604/174 |
| 7,001,352 B2 * | 2/2006 | Farrell et al. | 602/21 |
| 2008/0029721 A1 * | 2/2008 | Miyahara | 251/6 |

* cited by examiner

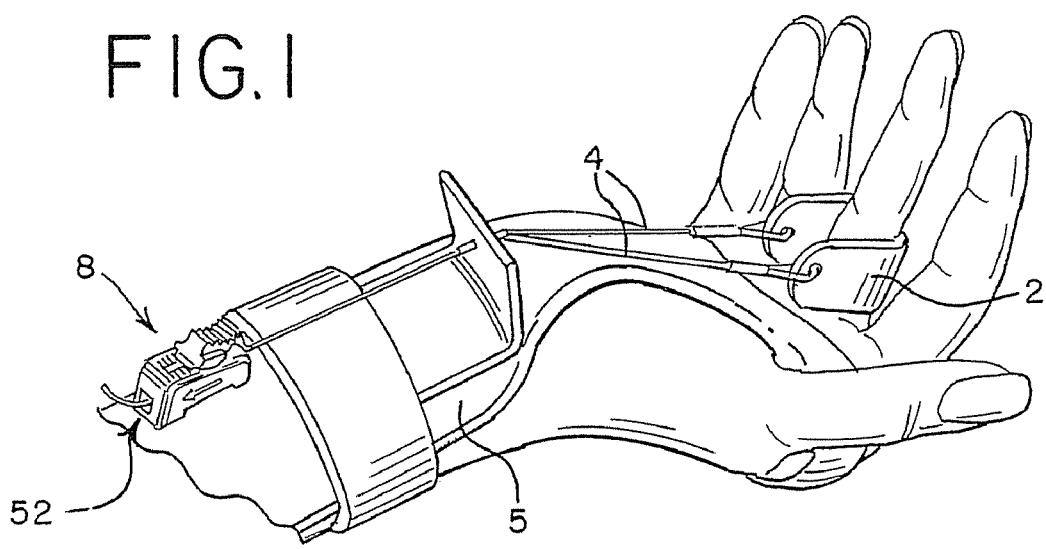
FIG.1
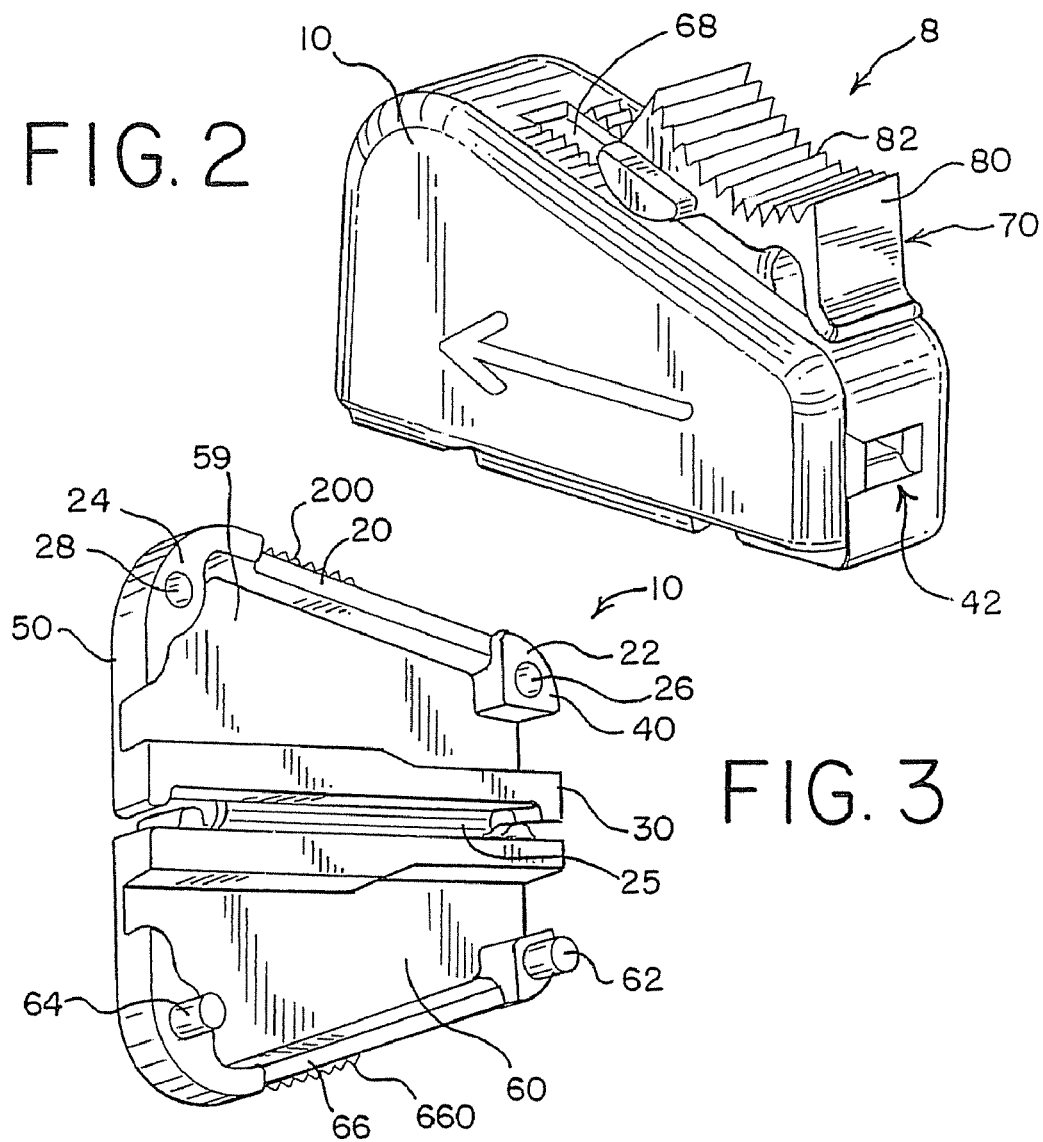
FIG.2
FIG.3

SLIDE LOCK

FIELD OF THE INVENTION

The present invention relates to static progressive splinting. More particularly, the present invention relates to a monofilament slide lock that is used in connection with a splinting apparatus to allow for the adjustment of inelastic traction.

BACKGROUND OF THE INVENTION

The use of splints in the treatment of certain injuries to joints and soft tissue is often an integral part of rehabilitation. Initially, following surgery or an injury, splinting can be used to immobilize and protect the injured area to allow healing. Unlike a cast, however, a splint can be removed for basic hygiene or wound care or to allow a patient to perform therapeutic exercises. Furthermore, depending on the injury and required treatment, a splint can be used to allow a range of motion to an injured joint.

Static progressive splinting, a technique using mobilization splinting with inelastic traction, is one of the most efficient methods for lengthening soft tissue with limited pliability and for increasing the progressive range of motion (PROM) of contracted joints. By splinting and maintaining tissue at the available end-range under low-load stress, the structures have time to grow new cells, and a new end-range is established. After the tissues lengthen, the inelastic mobilization component can be adjusted in small increments to maintain low-load prolonged stress at the newly established end-range.

Over the past twenty years, therapists have adjusted static progressive splints to produce low loads over a prolonged time. While rubber band traction was commonly used in the prior art, modern day static progressive splinting requires the use of devices that can be easily adjusted by the patient as muscles relax in the splint. Accordingly, therapists today typically construct static progressive splints by attaching turnbuckles or similar locking mechanisms to a thermoplastic brace and connect straps, strings, monofilaments, or click strips to the locking mechanism in order to position the splinted joint near the end range of motion.

While these modern day static progressive splinting techniques are effective for soft tissue rehabilitation, they are often heavy, bulky, or cumbersome. As a result, the devices can cause patient fatigue and catch on a patient's clothing. In addition, the large size and complexity of the devices precludes a therapist from using multiple units with a single splint and prevents a patient from easily adjusting the position of the splint. Accordingly, there is a demand for an improved mobilization device for use in static progressive splinting.

SUMMARY OF THE INVENTION

The present invention overcomes the deficiencies of the prior art by providing an improved immobilization device for static progressive splinting. In accordance with the present invention, the improved monofilament slide lock comprises a housing, a glide member, and a locking wheel.

One embodiment of the present invention provides for a housing having a low profile, streamlined design in order to prevent the device from snagging on a patient's clothes. It is another feature of the invention for the housing to accommodate and secure more than one monofilament, further reducing the overall size of the splint for a patient.

Yet another feature of the invention is to provide a glide member with a simple push button device for adjusting the tension of the splint along an unlimited range of motion. In addition, the overall size and weight of the slide lock is reduced to eliminate patient fatigue and compliance.

These and other features and advantages of the present invention will be apparent to those skilled in the art upon review of the following detailed description of the drawings and preferred embodiments.

BRIEF DESCRIPTION OF THE DRAWINGS

FIG. 1 is a perspective view of a static progressive splinting system utilizing the present invention.

FIG. 2 is a perspective view of the present invention.

FIG. 3 is a perspective view of the housing of present invention.

DETAILED DESCRIPTION OF THE INVENTION

Figure 4:
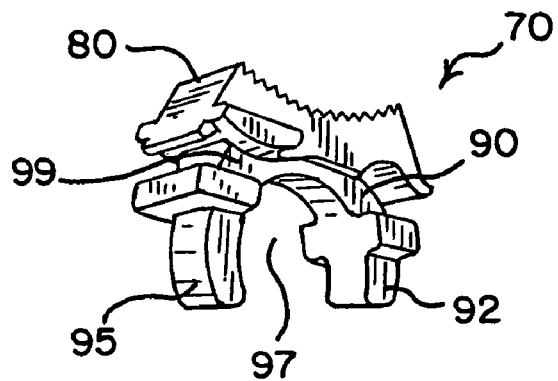
FIG. 4 is a perspective view of the glide member of the present invention.

A monofilament slide lock made in accordance with the principles of the present invention is depicted in FIGS. 2-6. The present invention is to be used in a static progressive splinting system such as the one shown in FIG. 1. The system 1 includes a sling 2, a plurality of monofilaments 4, a splint 5, and a monofilament slide lock 8 for securing the tension of the monofilaments 4. The slide lock 8 of the present invention generally comprises a housing 10, a glide member 70, and a locking wheel 100.

As shown in FIG. 3, the housing 10 has an upper ridge 20 and a lower ridge 30 positioned on a first sidewall 59. The upper ridge 20 extends from the rear surface 50 of the first sidewall 59 to the front surface 40 and terminates at each end at a column 22, 24. A second sidewall 60 has an upper ridge 66 and two posts 62, 64. Both upper ridges 20, 66 are preferably equipped with a textured outer surface 200, 660, and the second sidewall 60 is preferably linked to the lower ridge 30 on the first sidewall 59 with a connection strip 25. While many methods of connecting the sidewalls 59, 60 are well known in the art, the connection strip 25 is preferred because it maintains the alignment of the first sidewall 59 and second sidewall 60 when the housing 10 is assembled. Assembly of the housing 10 is then preferably completed by inserting the posts 62, 64 into the holes 26, 28 in each respective column 22, 24.

When the sidewalls 59, 60 are assembled as shown in FIG. 2, they define a slot 68 and a cavity (not shown) for the glide member 70. The glide member 70, shown in FIG. 4, has a button 80 and a base portion 90. In a completely assembled slide lock 8 shown in FIG. 2, the button 80 preferably resides on the outside of the housing 10 and has a curved and textured top surface 82 to allow a patient to easily grip and move the device. The button 80 may also be equipped with a lip 81 that engages with the textured outer surfaces 200, 660 of the upper ridges 20, 66.

Figure 5:
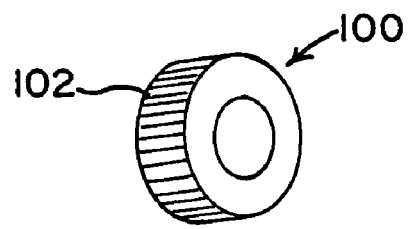
FIG. 5 is a perspective view of an alternate embodiment of the wheel of the present invention.

The base portion 90 of the glide member 70 resides in the cavity of the housing 10. In the preferred embodiment of the glide member 70 shown in FIG. 4, the base 90 has two legs 92, 95 that define a channel 99 and an arced open casing 97. The channel 99 is preferably sized to receive the upper ridges 20, 66 of the housing 10 while the arced open casing 97 is preferably sized to receive a locking wheel 100 such as is shown in FIG. 5.

Figure 6:
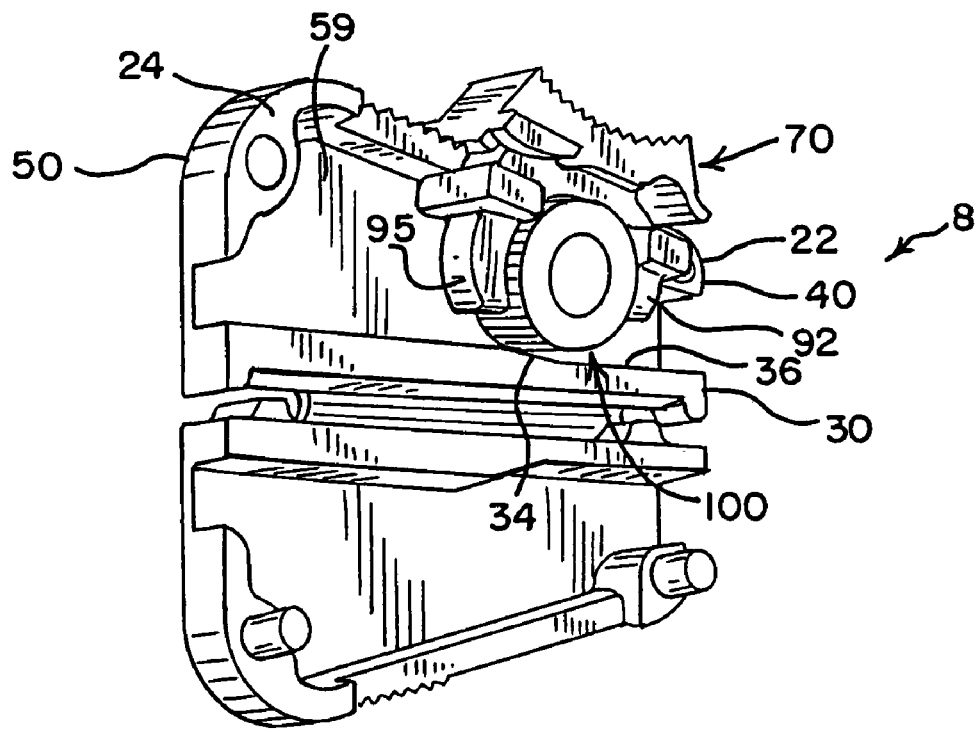
FIG. 6 is a perspective view of an assembly of the present invention.

In FIG. 6, the assembly of the slide lock 8 is shown. The upper ridge 20 of the first sidewall 59 of the housing 10 fits loosely within the channel 99 of the glide member 70, allowing the glide member 70 to slide on the upper ridge 20 between the two columns 22, 24. The locking wheel 100 similarly fits loosely within the arced open casing 97 of the glide 70, allowing the locking wheel 100 to rotate as the glide 70 slides between the two columns 22, 24.

In the preferred embodiment of a fully assembled slide lock 8, the wall of the lower ridge 30 defines the floor 36 of the housing cavity and the upper ridges 20, 66 slope downward from the rear surface 50 to the front surface 40. In order to accommodate for the sloped upper ridges 20, 66, the front leg 92 of the glide 70 is preferable shorter than the rear leg 95. With this configuration, when the glide 70 abuts the rear column 24, the locking wheel 100 is held above the floor 36, and when the glide 70 abuts the front column 22, the locking wheel engages the floor 36.

In order to use the completely assembled slide lock 8 shown in FIG. 2 as part of a static progressive splinting system 1 like that shown in FIG. 1, the slide lock 8 is simply attached to a thermoplastic splint 5 and the monofilaments 4 from the sling 2 are passed through a front opening 42, under the locking wheel 100 in the cavity, and out a rear opening 52. In order to control the tension in the monofilaments 4, the button 80 can then slide into place against the front column 22, forcing the locking wheel 100 against the monofilaments 4 and the floor 36. In this way, the slide lock 8 allows patients to adjust the tension of the monofilaments 4 to an infinite number of positions and thereby precisely control adjustments and document progress in the range of motion of an injured limb.

One skilled in the art of splinting should recognize that the monofilaments can be locked in place more effectively by adding textured surfaces to the slide lock of the present invention. For example, while a flat floor 36 will provide an adequate surface to secure the tension of the monofilaments 4, the floor 36 could also be equipped with a bump 34 to enhance the strength of the bond between the locking wheel 100 and the floor 36. Similarly, while a smooth outer surface on the locking wheel 100 will provide adequate tension, a knurled or textured outer surface 102 provides enhanced tension and is preferred. Finally, while smooth upper ridges 20, 66 and a smooth button 80 are adequate, the interaction of a lip 81 on the button 80 with the textured outer surfaces 200, 660 of the upper ridges 20, 66 provide a more secure lock.

One skilled in the art of splinting should also recognize that the slide lock 8 of the present invention could be made of many different materials and in many different sizes. In the preferred design, however, the housing 10 and glide 70 are constructed from plastic while the locking wheel is made of metal since these materials are exceptionally economical and lightweight. Furthermore, a low-profile, streamlined design measuring 1 cm wide by 2.5 cm long and only 1.2 cm high has proven to be the most effective size for eliminating snagged clothing, minimizing bulk, and allowing multiple slide locks to be used on a single splint.

It should be understood that the illustrated embodiments are exemplary only and should not be taken as limiting the scope of the present invention. The claims should not be read as limited to the order or elements unless stated to that effect. Therefore, all embodiments that come within the scope and spirit of the following claims and equivalents thereto are claimed as the invention.

We claim:

1. A static pressure splint for treating an injury of a hand comprising an inelastic mobilization component, a sling, and a slide lock comprising: (a) a housing comprising a floor, a slot, a first sidewall and a second sidewall, wherein the first and second sidewall together define an internal cavity, a front opening, and a rear opening, wherein the first sidewall has an upper ridge and a lower ridge, wherein each end of the upper ridge has a column; wherein the second sidewall has an upper ridge and a plurality of posts and each column is adapted to receive a post; (b) a glide, moveably engaged through the slot; and (c) a wheel, supported by the glide, whereby the inelastic mobilization component passes through the housing and is securely held in place between the wheel and the floor of the housing.

2. The static pressure splint of claim 1 wherein the slide lock upper ridge has a textured outer surface.

* * * * *